US009625902B2

(12) United States Patent
Knox

(10) Patent No.: US 9,625,902 B2
(45) Date of Patent: Apr. 18, 2017

(54) METHOD AND SYSTEM FOR DETECTING INTEGRITY OF A CONTROL LOOP OF A PHYSICAL SYSTEM

(71) Applicant: Bose Corporation, Framingham, MA (US)

(72) Inventor: Lawrence D. Knox, Hopkinton, MA (US)

(73) Assignee: Bose Corporation, Framingham, MA (US)

( * ) Notice: Subject to any disclaimer, the term of this patent is extended or adjusted under 35 U.S.C. 154(b) by 359 days.

(21) Appl. No.: 14/231,566

(22) Filed: Mar. 31, 2014

(65) Prior Publication Data

US 2015/0277390 A1 Oct. 1, 2015

(51) Int. Cl.
*G05B 11/01* (2006.01)
*G05B 23/02* (2006.01)

(52) U.S. Cl.
CPC ................................ *G05B 23/0256* (2013.01)

(58) Field of Classification Search
None
See application file for complete search history.

(56) References Cited

U.S. PATENT DOCUMENTS

| | | | | |
|---|---|---|---|---|
| 6,094,602 A * | 7/2000 | Schade, III | .............. | G05B 5/01 700/29 |
| 6,326,758 B1 * | 12/2001 | Discenzo | ........... | G05B 23/0294 318/432 |
| 2005/0274417 A1 | 12/2005 | Perry et al. | | |
| 2007/0218839 A1 | 9/2007 | Huck | | |
| 2008/0048603 A1 * | 2/2008 | Discenzo | ........... | G05B 19/4063 318/561 |
| 2008/0304188 A1 * | 12/2008 | Ichinose | ................. | F03D 9/003 361/20 |
| 2012/0200166 A1 * | 8/2012 | Berggren | .................. | H02J 3/24 307/102 |

FOREIGN PATENT DOCUMENTS

EP 2520996 A1 11/2012

OTHER PUBLICATIONS

Inernational Search Report and Written Opinion dated Jun. 17, 2015 for PCT/US15/23504.

* cited by examiner

*Primary Examiner* — Diem Cao
(74) *Attorney, Agent, or Firm* — Bose Corporation

(57) ABSTRACT

In a control loop, a command signal is applied to physical components to cause movement of the physical components. The position of the physical components is detected and used to generate subsequent command signals. In an implementation, an integrity detection system causes an excitation signal to be injected onto the command signal to cause movement of the physical components at an excitation frequency. This movement is detected in the physical system control loop and isolated by the integrity detection system. If the integrity detection system fails to detect energy in the excitation frequency band, a failure of at least one component of the control system is inferred.

14 Claims, 4 Drawing Sheets

METHOD AND SYSTEM FOR DETECTING INTEGRITY OF A CONTROL LOOP OF A PHYSICAL SYSTEM

BACKGROUND

This disclosure relates to control systems and related devices and methods and, more particularly, to a method and system for detecting integrity of a control loop of a physical system.

SUMMARY

All examples and features mentioned below can be combined in any technically possible way.

In one aspect, an apparatus for controlling a physical system includes a controller configured to output a command signal to control a state of a plant and to receive a feedback signal providing information about the state of the plant, and an integrity detection system. The integrity detection system is configured to output an excitation signal to the plant, receive the feedback signal, determine whether a component associated with the excitation signal is present in the feedback signal, and identify whether or not the closed loop control system is experiencing a failure based the determination.

In some implementations, the excitation signal has energy in a frequency spectrum, and the integrity detection system includes a first filter for filtering the feedback signal in a first frequency band encompassing at least a portion of the excitation signal frequency spectrum, and a level detector for measuring the filtered feedback signal level.

In certain implementations the integrity detection system further includes a noise level estimator for providing a noise level estimate of the feedback signal in the first frequency band, and a signal ratio computation block for computing a signal ratio, in which the signal ratio is the ratio of the filtered feedback signal to the noise estimate.

In some implementations the integrity detection system also includes a comparator for comparing the computed signal ratio to a predetermined threshold.

In certain implementations the integrity detection system is configured to cause the control system to enter a failsafe mode of operation when the computed signal ratio is less than the predetermined threshold.

In some implementations the noise level estimator includes a second filter for filtering the feedback signal in a second frequency band.

In certain implementations the second frequency band is different than the first frequency band but is sufficiently close to the first frequency band in order to provide an estimate of the noise level of the feedback signal in the first frequency band.

In some implementations, the apparatus also includes a variable gain amplifier for adjusting a gain of the excitation signal based on the noise level estimate.

In certain implementations the excitation signal output is combined with the command signal.

In another aspect a method of detecting integrity of a closed loop control system of a physical system includes outputting a command signal by a controller to control a state of a plant and receiving, by the controller, a feedback signal providing information about the state of the plant. The method also includes outputting an excitation signal into the closed loop control system, receiving the feedback signal, determining whether a component associated with the excitation signal is present in the feedback signal, and identifying whether or not the closed loop control system is experiencing a failure based the determination.

In some implementations the method also includes filtering the feedback signal in a first frequency band encompassing at least a portion of an excitation signal frequency spectrum, and measuring the filtered feedback signal level.

In certain implementations the method also includes estimating a noise level of the feedback signal in the first band, and computing a signal ratio, in which the signal ratio is the ratio of the filtered feedback signal to the noise estimate.

In some implementations the method also includes comparing the computed signal ratio to a predetermined threshold.

In certain implementations the method also includes causing the control system to enter a failsafe mode of operation when the computed signal ratio is less than the predetermined threshold.

In some implementations estimating the noise level includes filtering the feedback signal in a second frequency band.

In certain implementations the second frequency band is different than the first frequency band but is sufficiently close to the first frequency band in order to provide an estimate of the noise level of the feedback signal in the first frequency band.

In some implementations the method also includes adjusting an amplitude of the excitation signal based on the noise level estimate.

In certain implementations the excitation signal output is combined with the command signal.

In another aspect an apparatus for controlling a physical system includes means for outputting a excitation signal into the closed loop control system, means for receiving a feedback signal, means for determining whether a component associated with the excitation signal is present in the feedback signal, and means for identifying whether or not the closed loop control system is experiencing a failure based the determination.

DETAILED DESCRIPTION

Figure 1A:
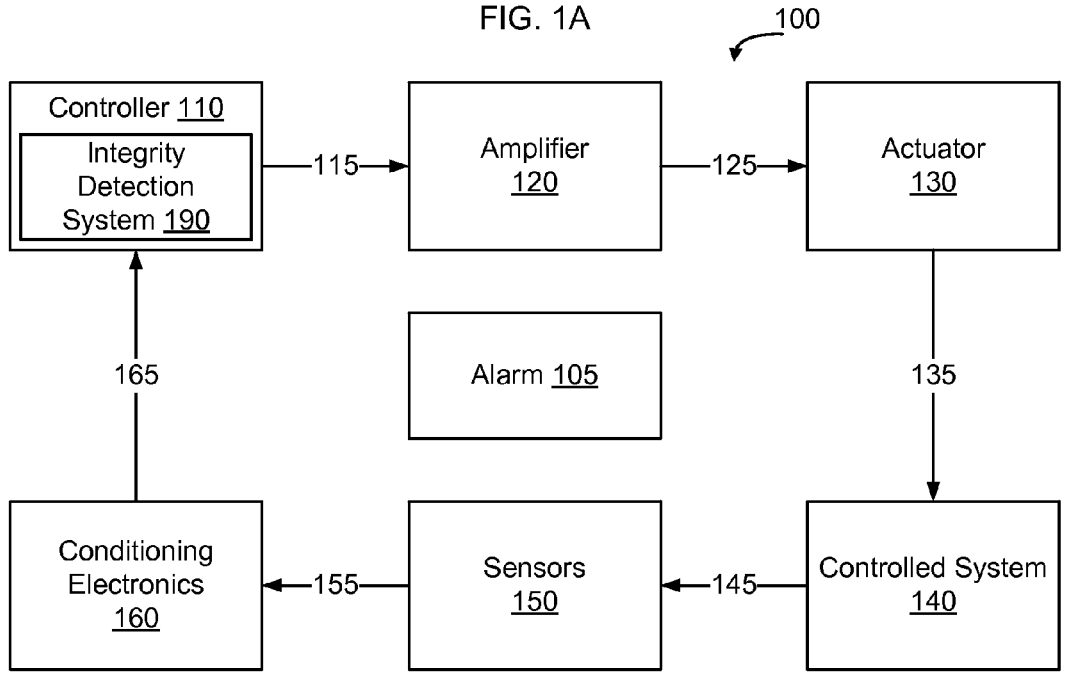
FIG. 1A is a block diagram of an example control loop of a physical system containing an integrity detection system.

This disclosure is based, at least in part, on the realization that there are instances where it can be beneficial to detect the integrity of a control loop of a physical system. In a control loop, a control signal is applied to physical components to cause movement of the physical components. The position of the physical components is detected and used to generate subsequent control signals. In an implementation, an integrity detection system causes an excitation signal to be injected onto the control signal to cause movement of the physical components at an excitation frequency. This movement is detected in the physical system control loop and isolated by the integrity detection system. If the integrity detection system fails to detect energy in the excitation frequency band, a failure of at least one component of the control system is inferred.

System Overview

Physical systems may contain active components that are driven by a command signal output by a controller which is part of a control system, to control one or more states of the physical system. The physical system to be controlled is referred to as the plant. The plant also includes dynamics of actuators used by the control system. In practice, the control system controls one or more states of the plant. A closed loop control system includes a feedback signal which is provided to the controller. The feedback signal provides information about one or more states of the plant back to the controller. The controller uses the information about states of the plant to generate the command signal. A control system may also obtain information regarding inputs applied to a plant in order to generate command signals. In some examples, this input information may be applied to the controller in a feed-forward manner.

Example physical systems of this nature may include suspension systems that support a platform relative to a carriage. In this case, the platform and any payload carried by the platform would comprise part of the plant. In one non-limiting example a suspension system supports a vehicle relative to one or more wheels. In one non-limiting example a suspension system supports a seat relative to a vehicle chassis. In these examples, one example of input information would be information regarding the road surface. Although these are two examples, many physical systems exist with active components that are controlled using a closed loop control system and, accordingly, these two examples are not intended to be limiting.

A control system may control one or more motion states of a plant. For example, position and acceleration of a suspended platform may be controlled relative to a mechanical ground reference which can be considered to be the base of the suspended platform. In one example, the mechanical ground reference may be the earth. A control system may control translational movement of components of the plant along one or more axes, such as along one or more of three coordinate axes in a Cartesian coordinate system. Likewise the control system may control rotational movement of the physical components such as by controlling roll, pitch and yaw. In general, the control system may be configured to control any combination of rotational and translational motion.

In some examples, the states to be controlled are not motional. For example, in a closed loop acoustical system such as an active noise reducing system, the state to be controlled may be acoustic pressure.

Figure 4:
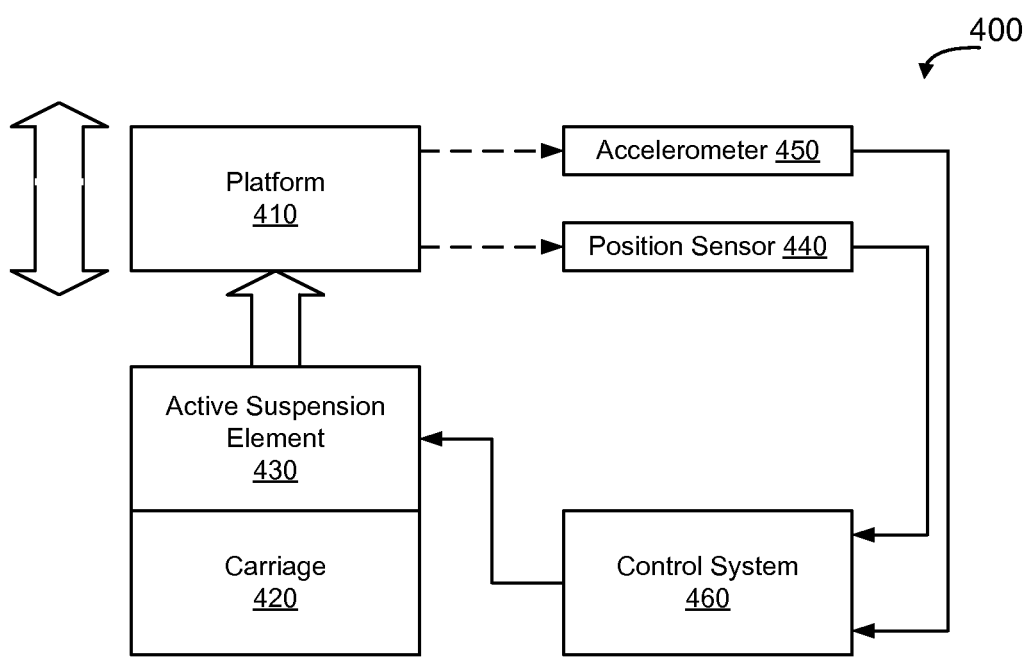
FIG. 4 is a block diagram representation of an example physical system including an active suspension.

FIG. 4 shows a block diagram representation of an example physical system 400 which includes a platform 410 that is able to move in at least one degree of freedom, such as in a vertical direction relative to a carriage 420. The physical system includes an active suspension element 430 which may be an actuator to drive the platform 410 in the vertical direction. The physical system 400 also includes one or more sensors to sense a state of some portion of the physical system, such as position sensor 440 and accelerometer 450, and control system 460. Position sensor 440 is arranged to sense the vertical position of the platform 410 and the accelerometer 450 is arranged to sense the vertical acceleration of the platform 410. Signals from the position sensor and accelerometer are provided to the control system 460 which uses the signals to adjust the active suspension element 430 to affect control over the platform 410. While the example suspension system shown in FIG. 4 only controls the plant in one degree of freedom of motion, as noted above the suspension system may control any number of degrees of freedom of motion of the platform relative to the carriage.

The active suspension element 430 may be implemented, for example, using a component such as an actuator. Example actuators include single or multi-phase electromagnetic actuators, such as three-phase linear actuators, single phase linear actuators, rotary actuators and variable reluctance actuators. Other example actuators may be hydraulic or pneumatic in nature. It should be understood that the embodiments disclosed herein are not limited to use with any particular actuator technology.

Any position sensor 440 with sufficient resolution and accuracy can be used to sense the position and/or motion of the physical component(s) and the particular sensor selected will depend on the particular implementation. Examples of suitable position sensors may include sensors having potentiometers, sensors that make use of the Hall effect, and sensors that have magnetostrictive sensors. Other types of position sensors may be utilized as well. Examples of suitable accelerometers include MEMs (micro-electro-mechanical) based accelerometers as well as other types of accelerometers. It should also be understood that certain motion states can be derived from measurements of other motion states, as is well known. For example, an acceleration signal output from an accelerometer can be integrated to provide a signal representative of velocity, or doubly integrated to provide a signal representative of position. Embodiments disclosed herein are not limited in the types of motion sensors that may be used.

An actively-suspended platform can be used in a variety of applications. For example, an actively-suspended platform can be an engine mount, a platform on a boat, a seat, bed, or cab used in any moving vehicle such as a car, truck, boat or other watercraft, train, bus, recreational vehicle, ambulance, tractor, truck-trailer, farm machinery, construction machinery, weapons platform, airplane, helicopter or other aircraft, a personal transportation device, such as a wheelchair, or a baby carriage. Other examples of actively-suspended platform include machine tool isolation tables, interferometer benches, photolithography tables, and the like.

The platform need not include a seat at all. It can, for example, be a bed for sleeping, such as those found in truck cabs or in sleeping cars on a train. Moreover, the platform need not carry a human being. For example, there exists cargo that is quite fragile (e.g. china and crystal) or quite explosive (e.g. dynamite), both of which are often transported very carefully. An actively-suspended platform would provide a suitable way to transport such cargo.

Moreover, the platform may cover a significant area. For example, on a luxury cruise ship it may be useful to have a barber shop, or a motion-sickness recovery lounge, that is isolated form ship motion such as roll, pitch and yaw.

In an active suspension system, failure of a component may cause the actuator to move unexpectedly. Particularly in a system using high force components, such as a vehicle suspension system or seat suspension system, unexpected movement due to a control loop failure may present a safety issue. Accordingly, early detection of component failure is important to enable the response of the physical system to be safely controlled in the event of a failure in the control system.

FIG. 1A shows a physical system 100 incorporating closed loop feedback-based control (control loop) that is provided with a control loop integrity detection system 190. In FIG. 1A, a controller 110 provides an output command signal 115 which is amplified by amplifier 120 and provided 125 to actuator 130. Actuator 130 imparts force 135 to controlled system 140. The controlled system 140 may be a suspension system or other system with moving parts. A motion or other state of one or more of the components within the controlled system 145 is sensed by sensors 150 which output positional and or motion based feedback signals 155. As noted above, the sensors may be accelerometers, position sensors, or other sensors designed to detect a state or states (i.e. motion states) of the controlled system.

Signals 155 from sensors 150 are passed to conditioning electronics 160 and output as feedback signal(s) 165 to controller 110. Controller 110 has a control law that it follows to attempt to maintain the controlled system at a target state. A simplified target state may be to minimize vertical acceleration of a suspended platform, for example. The controller receives feedback signals 165 indicative of the state of the controlled system 140 and determines an output to apply to the actuator 130 to minimize the difference between the measured system state and the desired system state. The determined output is reflected on command signal 115.

Controller 110 may be implemented using a microcontroller or other hardware configuration. It should be understood that the functions described in connection with FIG. 1A may be implemented using many different hardware configurations. In some configurations the functions of multiple functional blocks may be combined into a single hardware component. Likewise in some configurations the function of a given functional block in FIG. 1A may be implemented using multiple hardware components. The signals described as being exchanged between the functional blocks of FIG. 1A may be analog, digital, or some of the signals may be analog and some of the signals may be digital in a given implementation. In an implementation using a mixture of analog and digital signals, conversion between analog and digital signals would be implemented in a known manner, such as by using analog/digital and/or digital/analog converters.

Figure 1B:
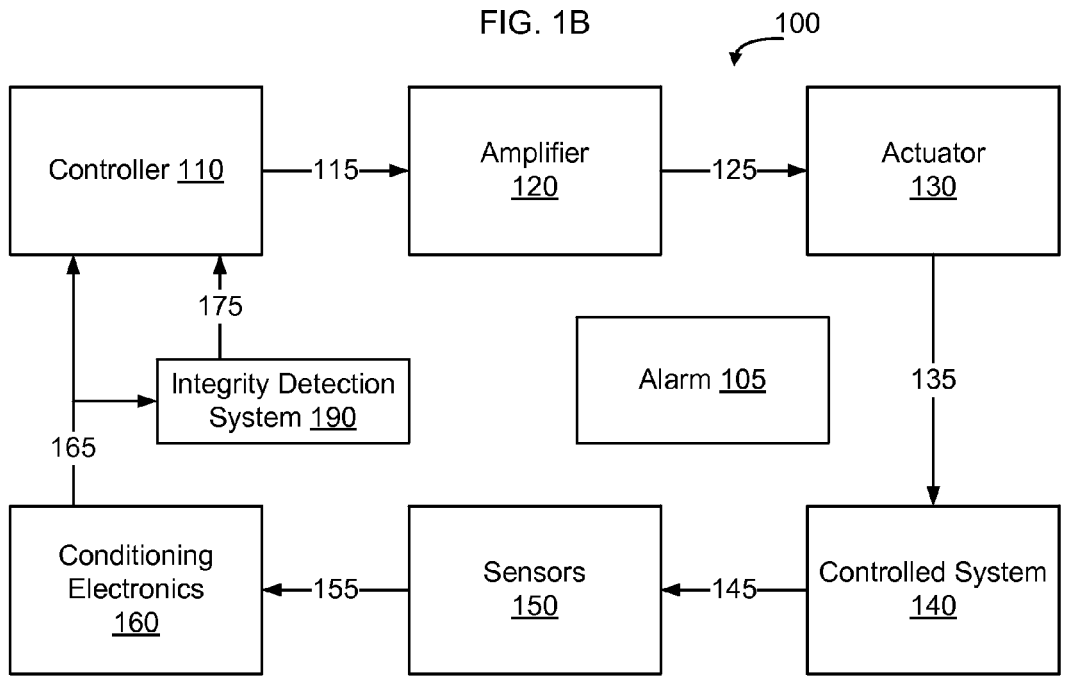
FIG. 1B is a block diagram of an example control loop of a physical system containing an integrity detection system.

According to an implementation, the control loop includes an integrity detection system 190 to detect the state of the control loop. The integrity detection system 190, as shown in FIG. 1A, may be implemented as part of one of the components of the control loop. For example, the integrity detection system 190 may be implemented within the controller 110. In other implementations the integrity detection system 190 may be implemented in one of the other components of the control loop 100 or as a stand-alone component as shown in FIG. 1B.

Upon detection of a failure, which is discussed in greater detail below, the integrity detection system 190 may generate an alert such as by activating an alarm 105. Additionally or alternatively the integrity detection system 190 may take action to cause the controlled system to enter into a failsafe mode of operation. The particular details associated with failsafe operation may vary depending on the application. For example, in one implementation placing the physical system in a failsafe mode of operation may include gracefully de-energizing the actuator 130 which, depending on the actuator, may cause the actuator 130 to act like a passive damper. In another example, placing the physical system in a failsafe mode of operation may completely remove the active suspension element from the system and replace it with passive suspension elements, for example using clutches and the like. In general, by quickly detecting a possible failure condition, it is possible to gracefully change system operation so that the physical system remains stable and large jolts in system state are not encountered.

As noted above, integrity detection system 190 is provided to detect failure of the closed loop control system. In one implementation, the integrity detection system injects an excitation signal 210 (see FIG. 2) onto the command signal 115 or into the control path at another location and looks for the presence of the signal at various locations within the system.

In one implementation, the excitation signal, which is input into the control loop of the physical system, has its energy concentrated in a selected frequency range. The integrity detection signal looks for the presence of the excitation signal elsewhere within the control loop to determine whether the control loop is functional. The integrity detection system may attempt to detect the presence of the excitation signal at the sensor output 155, 165, or anywhere else within the closed loop control system. The signals on which the detection is performed may be representative of position or some other state variable, depending on where in the system the detection is taking place. Also, by looking at multiple places within the loop, it is possible to determine not only that a failure occurred, but also to determine which component is likely to have failed. Knowing which component is likely to have failed can be beneficial in determining how the system should respond. For example, this information may be used to select between different failure responses when causing the system to enter into a failsafe mode of operation. As a non-limiting example, the process for entering into a failsafe mode of operation may be different when a sensor fails than when the actuator fails, or when an amplifier fails. In many situations, it is advantageous to at least attempt to detect the presence of the excitation signal at a point in the control loop just prior to the point where the excitation signal is injected into the control loop, so that the excitation signal passes through the entire control loop before being detected. This ensures that integrity of the entire loop is detected. However, in situations where the gain of the controller is low at the excitation frequency, it may be preferable to detect the presence of the excitation signal in the loop prior to the controller, for example on signal 165. As mentioned previously, attempting to detect the presence of the excitation signal at various other points within the control loop can provide additional information useful in isolating which component of the loop may have failed when a failure occurs.

The integrity detection system monitors the received signals for an indication that the physical components are exhibiting an expected physical response to the injected excitation signal. Detection of an indication of physical response by the physical system to the injected excitation signal indicates integrity of the system; an absence of the expected indication of physical response to the injected excitation signal indicates a possible failure. By monitoring the indication of physical response in the frequency range where energy from the excitation signal is centered, the integrity detection system can determine whether the injected excitation signal is causing movement that is reflected in physical response of the components of the physical system. The integrity detection system 190 thus allows the integrity of the control loop of the physical system to be quickly detected so that graceful shutdown may be implemented upon detection of a possible failure of the control system.

Figure 2:
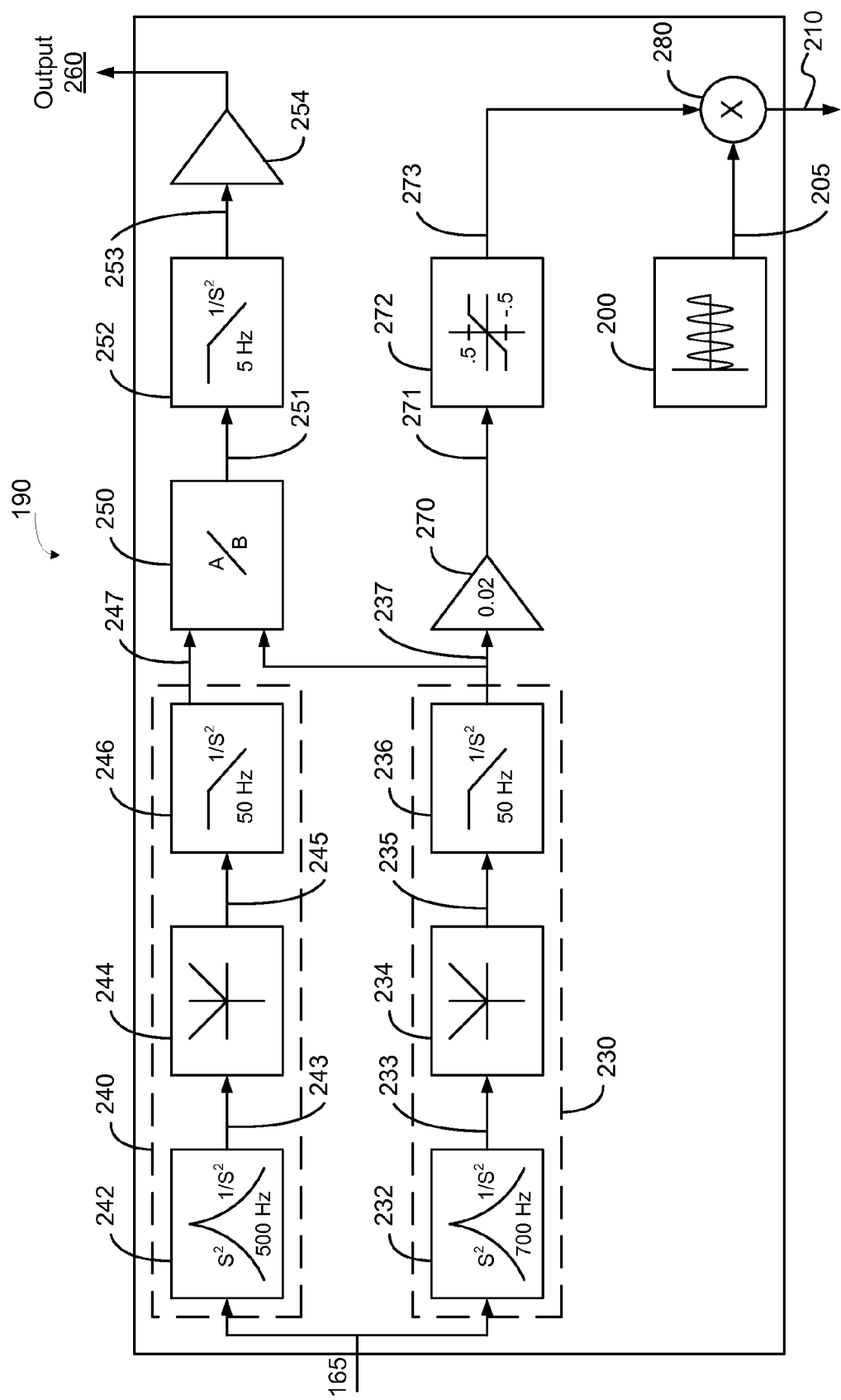
FIG. 2 is a block diagram of an example integrity detection system.

FIG. 2 shows an example integrity detection system 190. As shown in FIG. 2, in this example the integrity detection system includes a signal generator 200 which generates an excitation signal 205 that is scaled by amplifier 280 to a selected magnitude based on a noise value 273 detected within the system. The excitation signal 210 is injected onto command signal 115 into the control loop of the physical system. Although this implementation has the excitation signal injected onto the command signal, other implementations may otherwise cause the excitation signal to be provided to the actuator 130.

In the illustrated example, the excitation signal has been selected to be 500 hertz (Hz) sine wave, although other waveforms and frequencies may be used as well. The excitation signal is selected to have its energy centered in a frequency band that is sufficiently low so that the components of the physical system are able to react sufficiently to generate a detectable response to the excitation signal. One example of a detectable response would be a motional response. Likewise, the excitation signal is chosen to have its energy centered in a frequency range selected to be sufficiently high so that the payload is not negatively impacted by introduction of the excitation signal into the control loop. For example, in a seat suspension system, the excitation signal frequency may be selected such that movement of the components of the physical system is minimally perceptible to persons sitting on the seat. As another example, in a suspension system, movement of the physical components may be felt as vibration or heard as humming. Selecting a center frequency value such as 500 Hz was found to be within a frequency range where the components of the system are able to react, while also being sufficiently low so as not to be audible, and also being sufficiently high so as not to be tactilely perceptible as vibration. Other values may be selected as well depending on the particular implementation of the physical components and selection criteria employed.

The excitation signal is applied to the physical system as discussed above and a detected state or states of the physical system is/are returned to the integrity detection system 190 as feedback signal 165. In the implementation shown in FIG. 2, feedback signal 165 is passed in parallel to noise isolation circuit 230 and signal isolation circuit 240.

Noise isolation circuit 230 is provided to sense a noise floor level. Noise, in signal 165, includes electrical noise from sensors 150 and conditioning electronics 160, as well as vibrational noise associated with sensed motion of controlled system 140.

The noise isolation circuit, in the illustrated example, includes a narrow band (high-Q) band-pass filter that isolates a narrow band (component) of the noise signal energy in a portion of the frequency spectrum that is distinct from, but relatively close to where in frequency the energy in the excitation signal is centered. In the illustrated example (using an excitation signal with energy centered at 500 HZ) a band-pass filter 232 with a pass-band centered at 700 Hz has been selected for use in the noise isolation circuit 230, although other frequencies may be used as well. Detecting a noise level in a frequency band centered close to the frequency band where the excitation signal energy is centered provides an estimation of an expected noise level that is likely to exist around where the excitation signal energy is centered.

Other methods for estimating the noise energy present around the excitation signal center frequency are also contemplated herein. For example, in one non limiting example, since the excitation signal is generally known, an adaptive filter can be configured as is known in the art to operate as an adaptive canceller using the excitation signal as a reference such that the residual output of the adaptive canceller is the remaining signal present with the excitation signal removed. This signal could be filtered around the excitation signal center frequency to provide a noise estimate. In another non limiting example, the excitation signal could be gated on and off with time where the noise energy centered around the excitation signal center frequency is directly measured during the time periods when the excitation signal is turned off. Embodiments contemplated herein are not limited in the method used to obtain a measure of the noise present around an injected, known excitation signal.

Output 233 from the band-pass filter 232 is passed to a full wave rectifier 234 to obtain the absolute value 235 of the input 233. A second order low pass filter 236 removes high frequency components to obtain the noise floor level 237 at the selected noise comparison frequency. The low pass filter 236 in the illustrated example has a pass-band below 50 Hz which serves to smooth the level output by the noise comparison circuit.

The signal isolation circuit 240 is constructed similar to the noise isolation circuit 230. Specifically, the signal isolation circuit 240 includes a band-pass filter 242. The band-pass filter, in one implementation, is a narrow band (high-Q) band-pass filter that isolates a component of the feedback signal 165 centered at the excitation signal frequency. In the illustrated example, the excitation frequency was selected to be 500 Hz and, accordingly, the band-pass filter 242 in this implementation has a pass-band centered at 500 Hz.

Output 243 from the band-pass filter 242 is passed to a full wave rectifier 244 to obtain the absolute value 245 of the input 243. A second order low pass filter 246 removes high frequency components to obtain a value representative of the average signal level at the selected excitation frequency 247. The low pass filter 246 in the illustrated example has a pass-band below 50 Hz which serves to smooth the level output by the signal isolation circuit.

The level 247 output by the signal isolation circuit 240 is then combined in computation block 250 with the noise floor level 237 output by the noise isolation circuit 230 to generate a signal ratio 251. More specifically, the signal isolated by signal isolation circuit 240 includes noise as well as signal, and therefore computation block 250 technically is computing a "signal plus noise" to noise ratio (S+N)/N ratio. For convenience, this description will use the term "signal ratio" to refer to the ratio computed by computation block 250. The signal ratio 251 is passed through a low-pass filter 252 having a very low cutoff frequency. In the illustrated example the cut-off frequency for low-pass filter 252 is 5 Hz, although other values may be used as well. The effect of low pass filter 252 is to smooth the variations in the computed signal ratio provided by computation block 250.

It is desirable to reduce the amount of spectral energy that leaks from the excitation signal into the noise comparison frequency band. It is also desirable to have the bandwidth of the frequency selective filters for isolating the excitation signal and isolating the noise (filters 242 and 232 in FIG. 2) to have similar bandwidths and frequency response shapes such that energy estimates from filter outputs can be more readily compared. It may be desirable for the stop bands of the adjacent filters to intersect somewhere around at most −20 dB relative to the filter gain at the center of the filter passbands, and preferably closer to −40 dB. This means that the closer the center frequencies of the two filters are to each other, the higher the slope of their rolloff needs to be. Accordingly, the selection of a noise comparison frequency in some implementations will depend on the distribution of spectral energy of the selected excitation signal as well as the particular characteristics of the filters used to isolate the excitation signal and noise. However, it is desirable for the excitation signal filter center frequency (which should generally be aligned with the center frequency of the excitation signal energy) and the noise filter center frequency to be relatively closely spaced such that the output of the noise filter more closely approximates the noise present around the center frequency of the excitation signal.

If the control loop is operating correctly, it may be expected that the value of the excitation signal spectral energy represented by signal 247, which is detected by the signal isolation circuit 240, will be significantly larger than the noise spectral energy represented by signal 237 which is detected by noise isolation circuit 230. Accordingly, a comparison is made by comparator 254 to determine whether the signal ratio 253 output by low pass filter 252 is larger than a predetermined threshold signal ratio. For example the threshold may be set to a factor of 5, although other values may be used as well. If the signal ratio 253 exceeds the threshold, then the system is assumed to be OK. The output 260 of the comparator 254 is used to indicate whether the system is likely to be experiencing failure. If the output 260 from comparator 254 is high, the signal ratio is above the threshold and the system is OK. If the output 260 from comparator 254 is low, the signal ratio 253 is below the threshold, and the system may be experiencing failure. Alternatively, the high and low states of the comparator could be reversed if desired. An alarm or other indication may be generated upon detection of a system failure and, as discussed above, one or more actions may be implemented to enable graceful shutdown of the system by placing the system in failsafe mode of operation. An active suspension system that provides for graceful shutdown is described in U.S. application Ser. No. 13/664,540 filed Oct. 31, 2012, the content of which is hereby incorporated herein by reference.

The noise level 237 output by noise isolation circuit 230 is also used to set the level of the excitation signal 210. Specifically, the noise level 237 output by noise isolation circuit 230 is input to amplifier 270 which scales the noise level. The output 271 from amplifier 270 is limited by clipper 272 and provided as a scaling factor 273 which is input to variable gain amplifier 280 to control the gain of the excitation reference signal 205 output from signal generator 200 to form excitation signal 210 for injection into the control loop. By applying the scaling factor 273 to the excitation reference signal 205, which is based on the detected noise level, it is possible to set the excitation signal 210 at a level which will cause the signal at the excitation frequency in the feedback signal 165 to exceed the known noise level by at least the threshold during normal operation of the control loop of the physical system.

In the implementation shown in FIG. 2, the magnitude of signal 205 is sufficiently large such that amplification of the signal is not required before scaling using the scaling factor. If the magnitude of signal 205 is not sufficiently large to achieve a signal ratio 253 in excess of the threshold during normal operation, then a variable gain circuit may be applied to further amplify the signal 205 to adjust the magnitude of signal 210.

Figure 3:
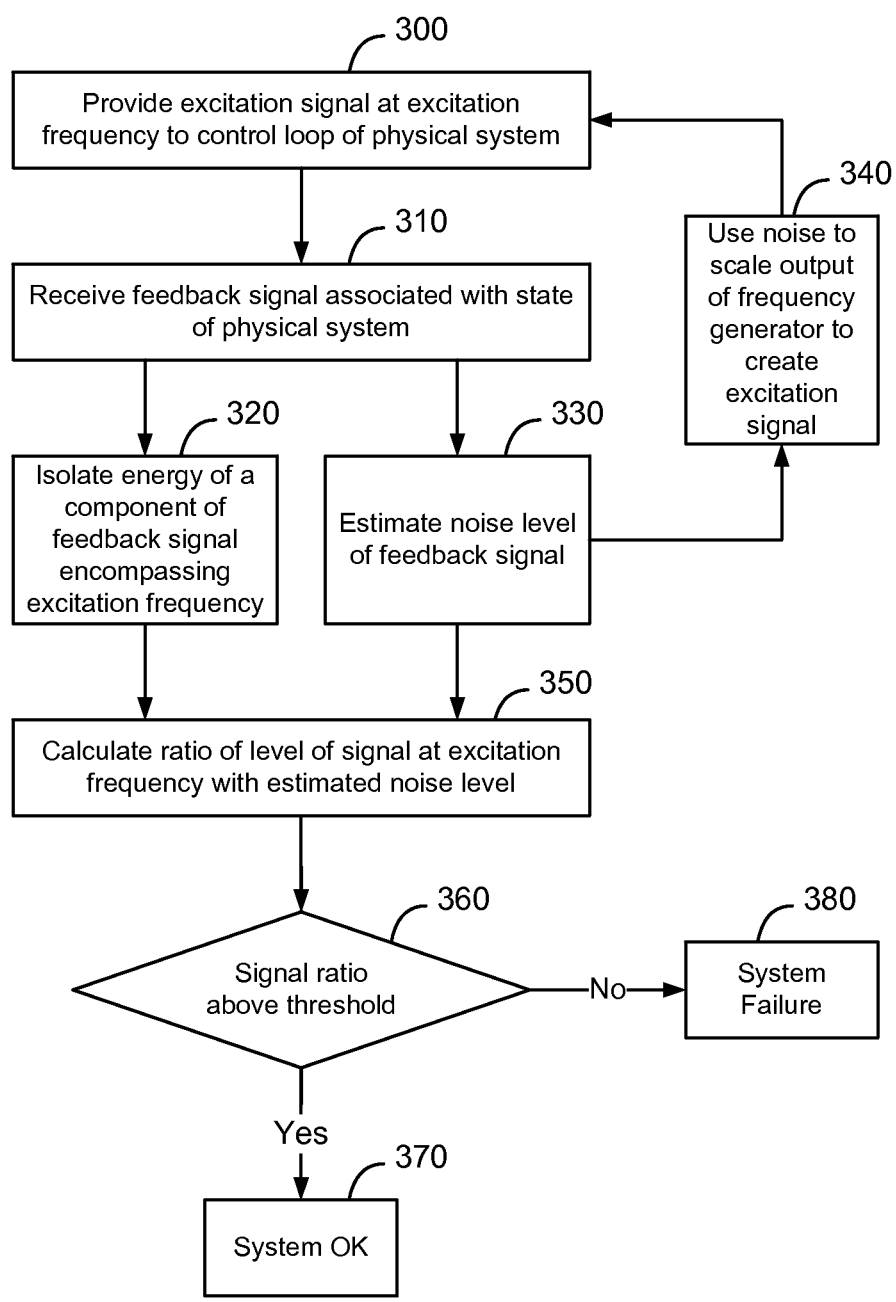
FIG. 3 is a flow diagram of an example method of detecting integrity of a control loop of a physical system.

FIG. 3 shows an example method of detecting integrity of a control loop of a physical system. As shown in FIG. 3, the method includes providing an excitation signal to a control system of a physical system (300). The state of the physical system is monitored at one or more locations within the control loop to obtain one or more feedback signals (310).

An amount of spectral energy present in a sensor signal centered around the excitation signal center frequency is determined (320). An estimate of the noise energy level at the excitation signal center frequency is also determined, for example by measuring the spectral energy present in the feedback signal 165 at a noise comparison frequency as discussed above in connection with FIG. 2 (330).

The noise level estimate is used in two ways. First, the noise level estimate is used to scale the excitation signal (340). This allows the magnitude of the excitation signal to be set to a level where it is perceptible at the various monitoring points within the system during normal operation when compared to the noise level of the feedback signal. Second, the noise level estimate is used along with the measured spectral energy around the excitation signal center frequency to form a signal ratio 350. The signal ratio is compared with a threshold signal ratio (360). If the signal ratio exceeds the threshold (370) it is assumed that the excitation signal is present in the feedback signal which indicates that the control loop is functioning.

To the contrary, if the signal ratio does not exceed the threshold, the control loop may be experiencing a failure (380). Upon determination of a potential failure, an alarm may be triggered and/or one or more actions may be taken to enable the system to enter a failsafe mode of operation or otherwise to be gracefully shut down. The particular action taken will depend on the implementation.

Implementations of the systems and methods described above comprise computer components and computer-implemented steps that will be apparent to those skilled in the art. For example, it should be understood by one of skill in the art that the computer-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the computer-executable instructions may be executed on a variety of processors such as, for example, microprocessors, digital signal processors, gate arrays, etc. In addition, the instructions may be implemented in a high-level procedural and/or object-oriented programming language, and/or in assembly/machine language. For ease of exposition, not every step or element of the systems and methods described above is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other implementations are within the scope of the following claims.

What is claimed is:

1. An apparatus for controlling a closed loop control system of a physical system, the apparatus comprising:
a controller configured to output a command signal to control a state of a plant of the physical system and to receive a feedback signal providing information about the state of the plant; and
an integrity detection system, wherein the integrity detection system is configured to:
output an excitation signal to the plant;
receive the feedback signal;

determine whether a component associated with the excitation signal is present in the feedback signal; and identify whether or not the closed loop control system is experiencing a failure based the determination;

wherein the excitation signal has energy in a frequency spectrum, wherein the integrity detection system comprises:

a first filter for filtering the feedback signal in a first frequency band encompassing at least a portion of the excitation signal frequency spectrum;

a level detector for measuring the filtered feedback signal level;

a noise level estimator for providing a noise level estimate of the feedback signal in the first frequency band; and a signal ratio computation block for computing a signal ratio, wherein the signal ratio is the ratio of the filtered feedback signal to the noise estimate.

2. The apparatus for controlling a physical system of claim 1, further comprising a comparator for comparing the computed signal ratio to a predetermined threshold.

3. The apparatus for controlling a physical system of claim 2, wherein the integrity detection system is configured to cause the control system to enter a failsafe mode of operation when the computed signal ratio is less than the predetermined threshold.

4. The apparatus for controlling a physical system of claim 1, wherein the noise level estimator comprises a second filter for filtering the feedback signal in a second frequency band.

5. The apparatus for controlling a physical system of claim 4, wherein the second frequency band is different than the first frequency band but is sufficiently close to the first frequency band in order to provide an estimate of the noise level of the feedback signal in the first frequency band.

6. The apparatus for controlling a physical system of claim 1, further comprising a variable gain amplifier for adjusting a gain of the excitation signal based on the noise level estimate.

7. The apparatus for controlling a physical system of claim 1, wherein the excitation signal output is combined with the command signal.

8. A method of detecting integrity of a closed loop control system of a physical system, the method comprising:

outputting a command signal by a controller to control a state of a plant of the physical system;

receiving, by the controller, a feedback signal providing information about the state of the plant;

outputting an excitation signal into the closed loop control system;

receiving the feedback signal;

determining whether a component associated with the excitation signal is present in the feedback signal;

identifying whether or not the closed loop control system is experiencing a failure based the determination;

filtering the feedback signal in a first frequency band encompassing at least a portion of an excitation signal frequency spectrum;

measuring the filtered feedback signal level;

estimating a noise level of the feedback signal in the first band; and computing a signal ratio, wherein the signal ratio is the ratio of the filtered feedback signal to the noise estimate.

9. The method of claim 8, further comprising comparing the computed signal ratio to a predetermined threshold.

10. The method of claim 9, further comprising causing the control system to enter a failsafe mode of operation when the computed signal ratio is less than the predetermined threshold.

11. The method of claim 8, wherein estimating the noise level comprises filtering the feedback signal in a second frequency band.

12. The method of claim 11, wherein the second frequency band is different than the first frequency band but is sufficiently close to the first frequency band in order to provide an estimate of the noise level of the feedback signal in the first frequency band.

13. The method of claim 8, further comprising adjusting an amplitude of the excitation signal based on the noise level estimate.

14. The method of claim 8, wherein the excitation signal output is combined with the command signal.

* * * * *